United States Patent [19]

Cole et al.

[11] Patent Number: 5,421,317
[45] Date of Patent: Jun. 6, 1995

[54] VENTILATED COOKING OVEN

[75] Inventors: J. Timothy Cole, Essex Junction, Vt.; David Rudzinski, Woodridge, Ill.

[73] Assignees: G. S. Blodgett Corporation, Burlington, Vt.; Avtec Industries, Inc., Oswego, Ill.

[21] Appl. No.: 298,291

[22] Filed: Aug. 31, 1994

[51] Int. Cl.[6] .............................................. F24C 15/32
[52] U.S. Cl. .................................. 126/21 A; 432/144; 432/152; 432/201; 432/205
[58] Field of Search .......................... 126/21 R, 21 A; 432/144, 150, 152, 200, 201, 205

[56] References Cited

U.S. PATENT DOCUMENTS

| | | |
|---|---|---|
| 4,616,562 | 10/1986 | Kuechler . |
| 4,738,243 | 4/1988 | Welsh et al. . |
| 4,896,657 | 1/1990 | Glassman . |
| 4,960,100 | 10/1990 | Pellicane . |
| 5,231,920 | 8/1993 | Alden et al. . |
| 5,299,557 | 4/1994 | Braithwaite et al. . |

Primary Examiner—Carroll B. Dority
Attorney, Agent, or Firm—Lowe, Price, LeBlanc & Becker

[57] ABSTRACT

A ventilated conveyor oven is provided. The oven uses a makeup air fan to admit air to the plenum extending across the front of the unit and across the top of the unit. Exhaust channels are provided on the sides spaced above and below the conveyor oven entrance and exit and extending across the top to an exhaust fan outlet. The exhaust channels on the top are superimposed over the air makeup plenum. Vertical exhaust plenums are provided at each of three corners, with the fourth corner mounting a control panel and an air makeup external channel thereover.

16 Claims, 10 Drawing Sheets

FIG. 8B
FIG. 9B
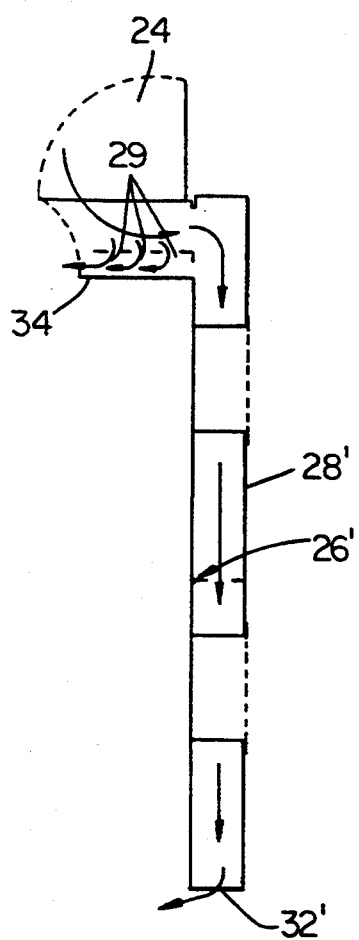
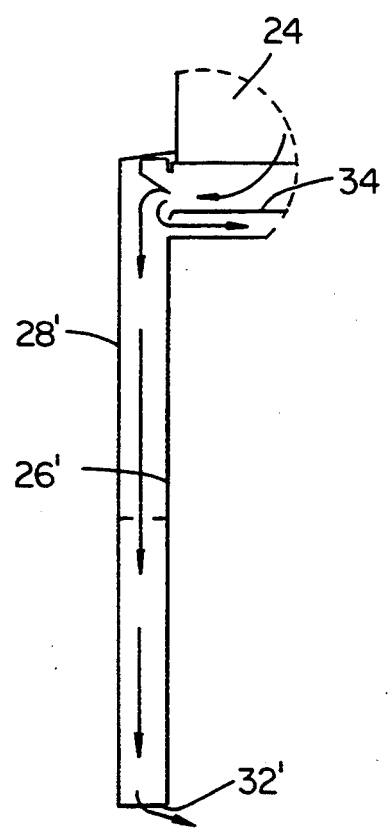

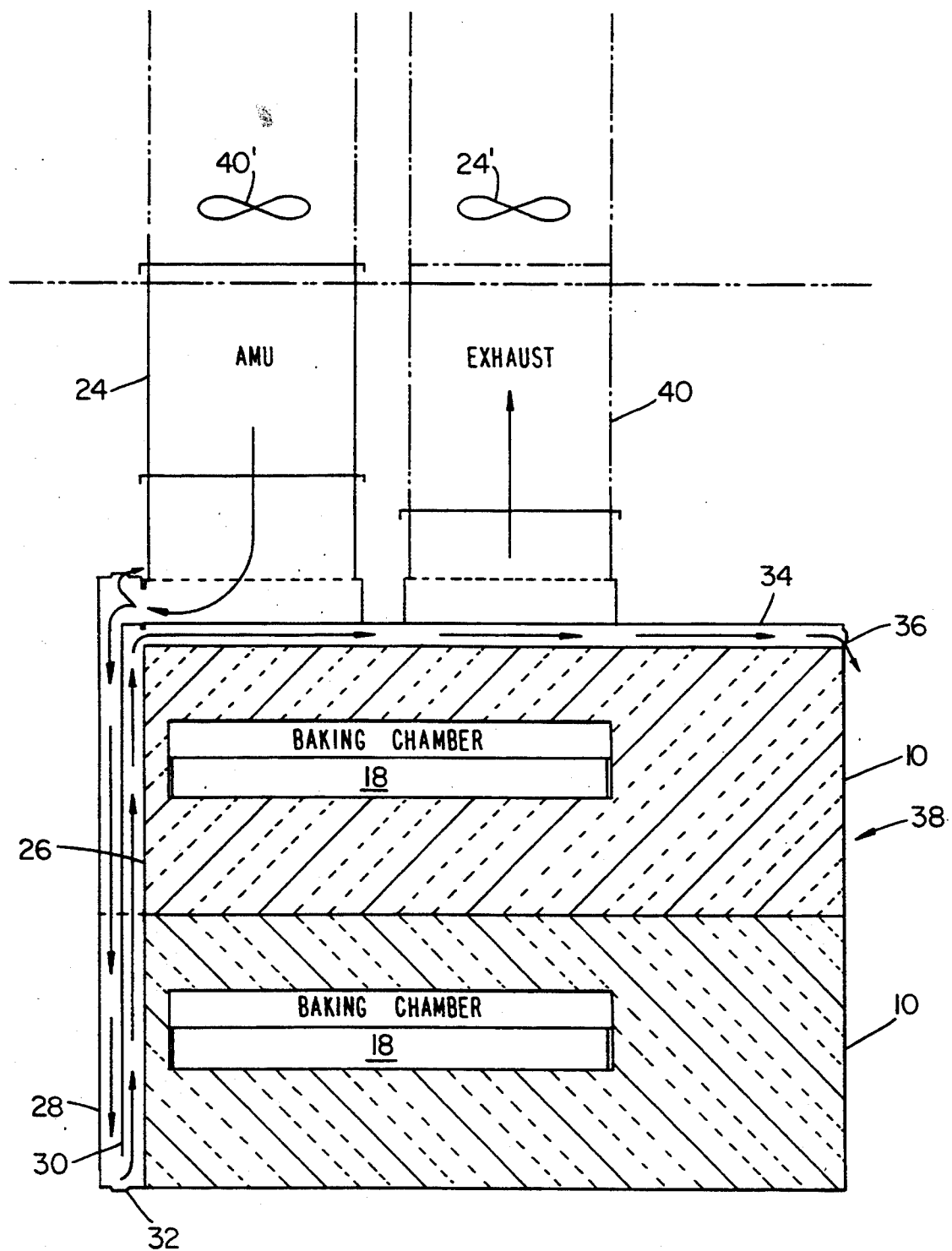

VENTILATED COOKING OVEN

FIELD OF THE INVENTION

This invention relates to one or more stackable conveyorized ovens which are ventilated so that they can be used in confined areas without emitting excessive heat or noise into the ambient atmosphere.

DESCRIPTION OF THE PRIOR ART

In recent years conveyor ovens have been used more frequently in, for example, fast food type establishments, and in particular, in the cooking of pizza. In a conveyor oven situation, one or more units are usually stacked, and each has a conveyor that passes through its own housing and oven chamber wherein convection currents of heated air are directed onto the food mounted on the conveyor. In the case of pizza then a frozen pizza can be loaded on the conveyor at one end, and when it emerges from the opposite end if will be fully cooked. Conveyor ovens have obvious advantages in minimizing the handling of the food products, uniform cooking conditions, and suitability for mass production in that typically two or three units are stacked and food can be continuously loaded and cooked. See, for example, U.S. Pat. Nos. 4,960,100 and 5,231,920.

Typically, conveyor ovens use convection currents of air and the currents are circulated by powerful fans. In addition, by having an entrance opening and an exit opening, heated air from the oven chamber can be lost into the surrounding atmosphere. In the confined space for example of a fast food establishment, the noise from the fans and the heat generated by the ovens and expelled through the conveyor openings can be a major problem for personnel attempting to operate the ovens.

Originally it was considered that the situation could be eased by using a conventional canopy hood which would be hung over the oven stack and operated to expel any cooking gases which leaked via the conveyor route from the oven chambers. Obviously a conventional hood of the canopy type would be only minimally effective against the hot gases, and would not achieve any reduction of the noise from oven convection fans.

Other oven designs were provided for example in U.S. Pat. Nos. 4,616,562; 4,738,243; and 4,896,657 which met with minimal success.

Subsequently, it was described in U.S. Pat. No. 5,299,557 that a double-walled enclosure could be hung from the canopy hood which itself is suspended from the kitchen ceiling and thereby used to surround the stacked ovens to more efficiently expel the heated cooking gases and minimize the noise level from operation of for example conventional conveyor ovens. In that design, the space between the inner wall and the oven is maintained at negative air pressure by the exhaust fan in the hood. In contrast, the space between the inner and outer walls of the enclosure is positive because of the air makeup added which typically would be cool outside air. The air makeup then circulates through the outer wall, and then is drawn into the interior by the exhaust fan. This structure then is essentially a housing for an oven rather than a ventilated oven. This design suffers from at least the following problems:

Cool make-up air is mixed with hot cooking gas before being exhausted. This promotes condensation within the unit and increased cleaning requirements.

The enclosure is essentially an isolated room within the kitchen which must be supported typically by the ceiling structure. Therefore, the housing creates construction problems and in addition is difficult to disassemble for cleaning or maintenance of the oven. Access to the oven for cooking or food removal is restricted by doors. The double-walled construction also increases space requirements and costs.

SUMMARY OF THE INVENTION

It has been discovered however, that a highly efficient oven structure can be constructed which will ventilate the exterior of an oven wall so that the heat generated therein is effectively dissipated and exhausted to the outside atmosphere rather than being expelled into the kitchen. In addition, the device of this invention does not include a canopy hood, but rather is in effect a free-standing oven with ventilated walls, or more accurately, a stack of ovens having an external ventilated shell.

In the device of this invention, a single wall construction is used over all sides except the back wherein air makeup flows into the enclosure at the top thereof, and over the front wall; and over the top, whereupon it is expelled downwardly into the room over the back wall of the oven stack, and the exhaust fan draws room air as well as heated air from the oven into the two sides and over the top thereof to be expelled. Typically, the front of the oven will also have an access door for the oven interior and heated air from the baking chamber is drawn in and circulated around the sides and upwardly over the top of the device to be exhausted by the exhaust fan. In addition, the device of this invention effectively minimizes the noise generated by the conveyer oven fans by enclosing the stacked ovens.

In the device of this invention the access to the ovens for cooking and removal is readily achieved through the unobstructed sides. Access to the cooking chamber for inspection and cleaning is also available through a door in the front. In addition, the outside make-up air does not mix with the cooking gases in the exhaust. Cleaning then, is no more difficult than with conventional ovens.

Most importantly the ovens' fans which typically exhaust at the side, exhaust into a common vertical plenum which communicates with the ventilating exhaust fan which expels heated air from the baking chamber so that while the oven is cooled, heated air is not returned to the kitchen ambient. Further, the vertical plenum has ambient air inlets at the base thereof. In the event the roof top exhaust fan fails, the air inlets provide an escape route for heat from the oven blower motors so they will not overheat. In the event the oven blower fails the ventilating exhaust will maintain a negative pressure in the plenum whereby, in the event the burners are gas operated, the burners will not choke.

Accordingly, it is an object of this invention to provide a self-supporting, ventilated oven wherein a plurality of oven chambers are provided with a common shell with air circulating therethrough.

It is another object to provide a ventilated oven structure wherein makeup air from the outside is circulated over the upper portion and front of the structure while heated air from the conveyor openings in the oven chambers is taken up around the sides and circulated upwardly to be exhausted through the top of the structure.

It is a further object of this invention to provide a ventilated oven structure for a plurality of stacked conveyor ovens wherein the oven structure is fully ventilated by circulating air either from air makeup, or exhaust, access to the ovens for cleaning and the like is facilitated, and the structure can be readily disassembled.

These and other objects will become readily apparent with reference to the drawings and following description wherein:

BRIEF DESCRIPTION OF DRAWINGS

FIG. 8B is a fragmentary cross sectional view of another embodiment of the structure of this invention;

FIG. 9A is a schematic right side view of the embodiment of FIG. 8A;

FIG. 9B is a fragmentary view similar to FIG. 8B; and

DETAILED DESCRIPTION OF THE INVENTION

Figure 1:
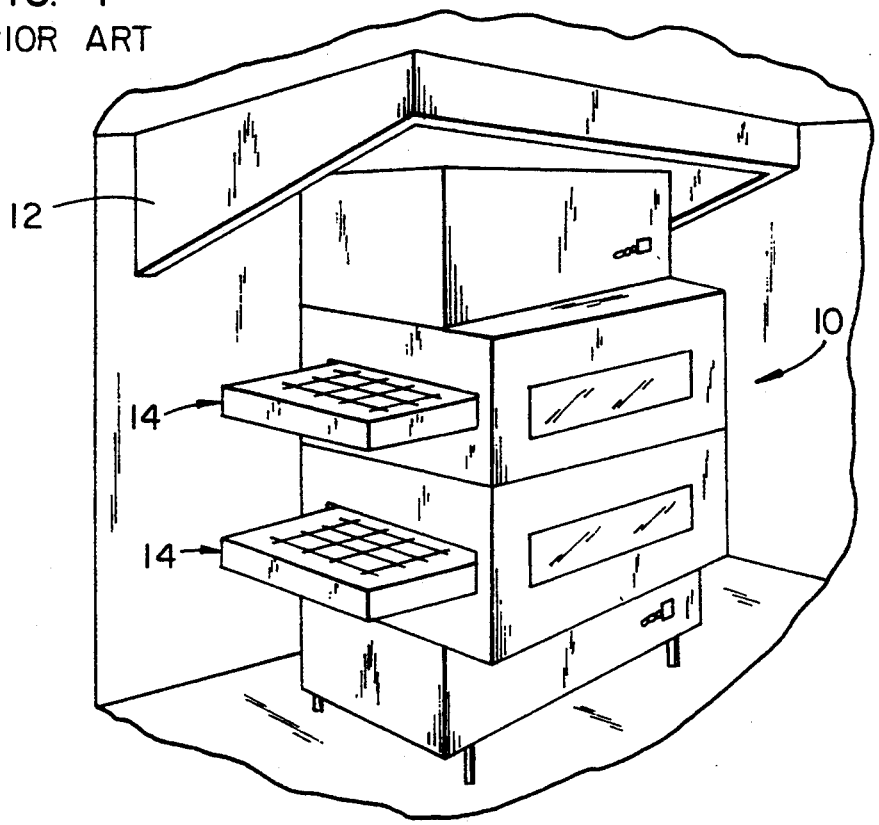
FIG. 1 is a perspective view of a prior art stacked conveyor oven structure using a canopy hood.
Figure 2:
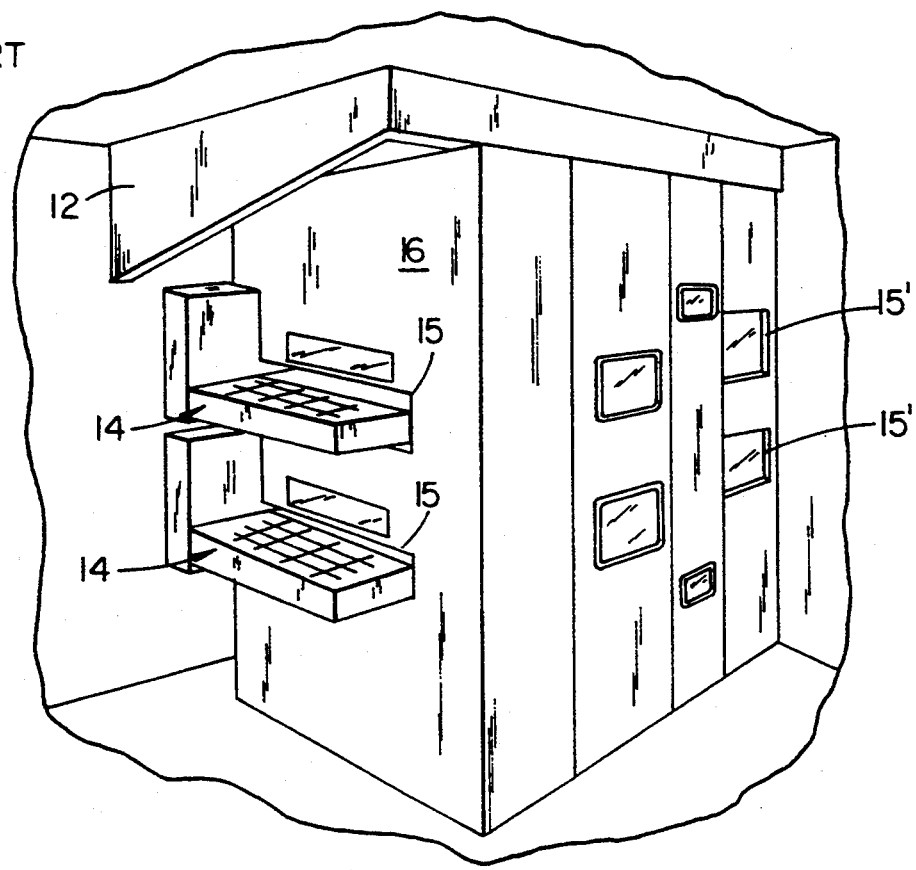
FIG. 2 is also a prior art perspective view of a stacked conveyor oven structure housed in walls which in turn are suspended from a canopy hood.

With reference to the drawings and to FIGS. 1 and 2 in particular, FIG. 1 shows a prior art device consisting of a pair of stacked conveyor ovens 10 with a conventional canopy hood 12 mounted thereover. As will be obvious to those skilled in the art, the conveyors 14 which are located on either side permit the expulsion of hot cooking gases into the ambient atmosphere which are intended to be sucked into the hood 12 for disposal. Clearly, however, because of the size of the ovens 10, the hood 12 cannot be as effective as would be desired in, for example, the close confines of a fast food type kitchen. In FIG. 2, the prior art device used a double-walled structure 16 to surround the ovens with conveyors 14 extending from the entrance 15. Cooked food is removed through doors 15. The double wall structure 16 then is suspended or hung from the canopy 12 and surrounds the ovens on all four sides so that there is a space between the inner wall (not shown) and the oven as well as space between the inner and outer walls (also not shown) of structure 16, for air circulation. See U.S. Pat. No. 5,299,557.

This four-walled structure then is difficult to dismantle for cleaning. It also provides restricted access to the cooking chamber to remove cooked food through door 15. The double walls, of course, are bulky and heavy because they are intended to isolate the ovens from the ambient atmosphere.

Figure 3:
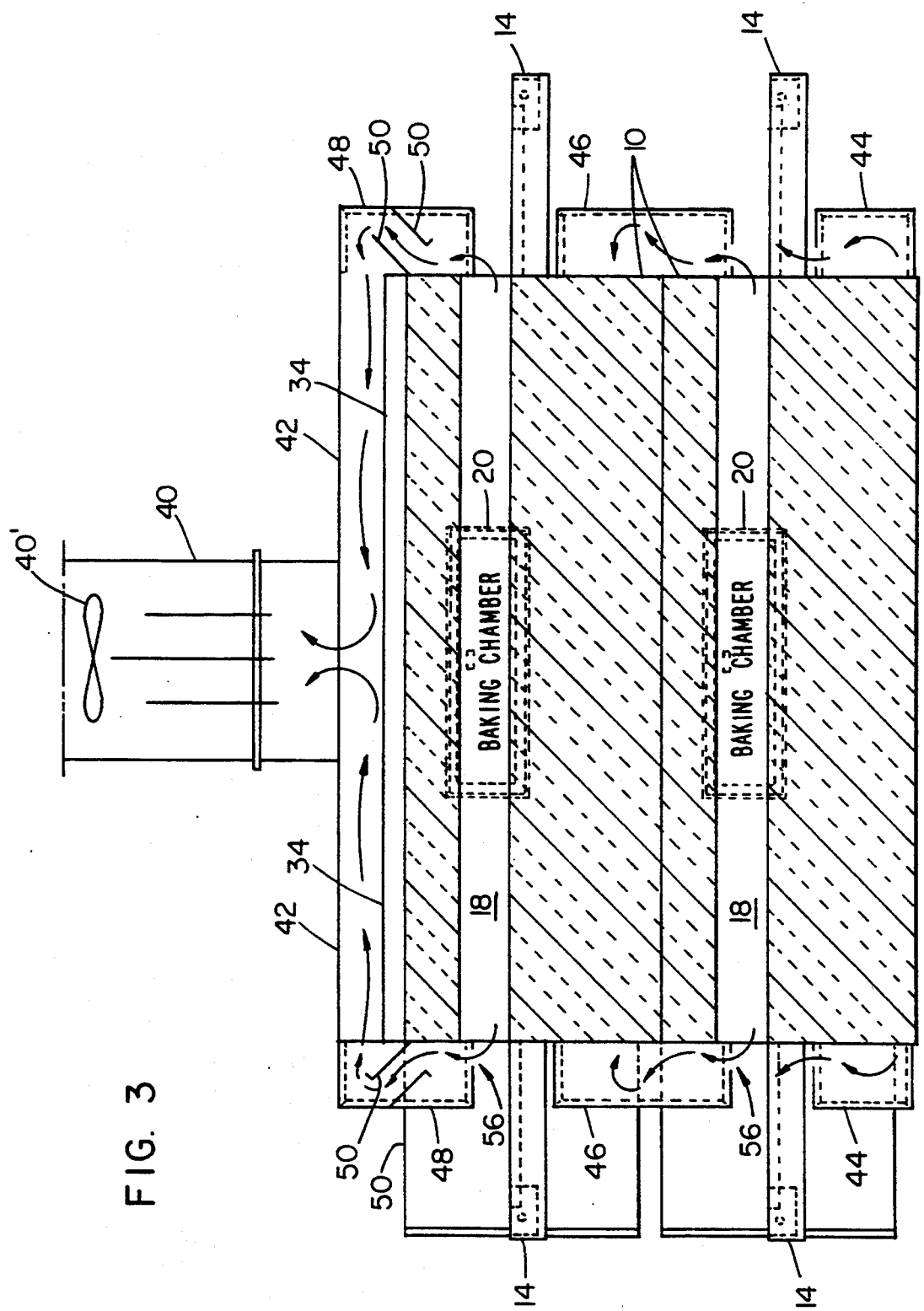
FIG. 3 is a front schematic view of the device of this invention with two stacked conveyor ovens.

With further attention to the drawings and to FIGS. 3, 8 and 9 in particular, it has been discovered that a much more efficient structure can be provided for isolating ovens from the ambient atmosphere in the kitchen, both from the standpoint of minimizing the expulsion of heat into the kitchen, and in attempting to reduce oven noise. The device of this invention as will be subsequently explained, does not utilize a canopy type hood or a double walled structure to surround the oven.

Figure 8A:
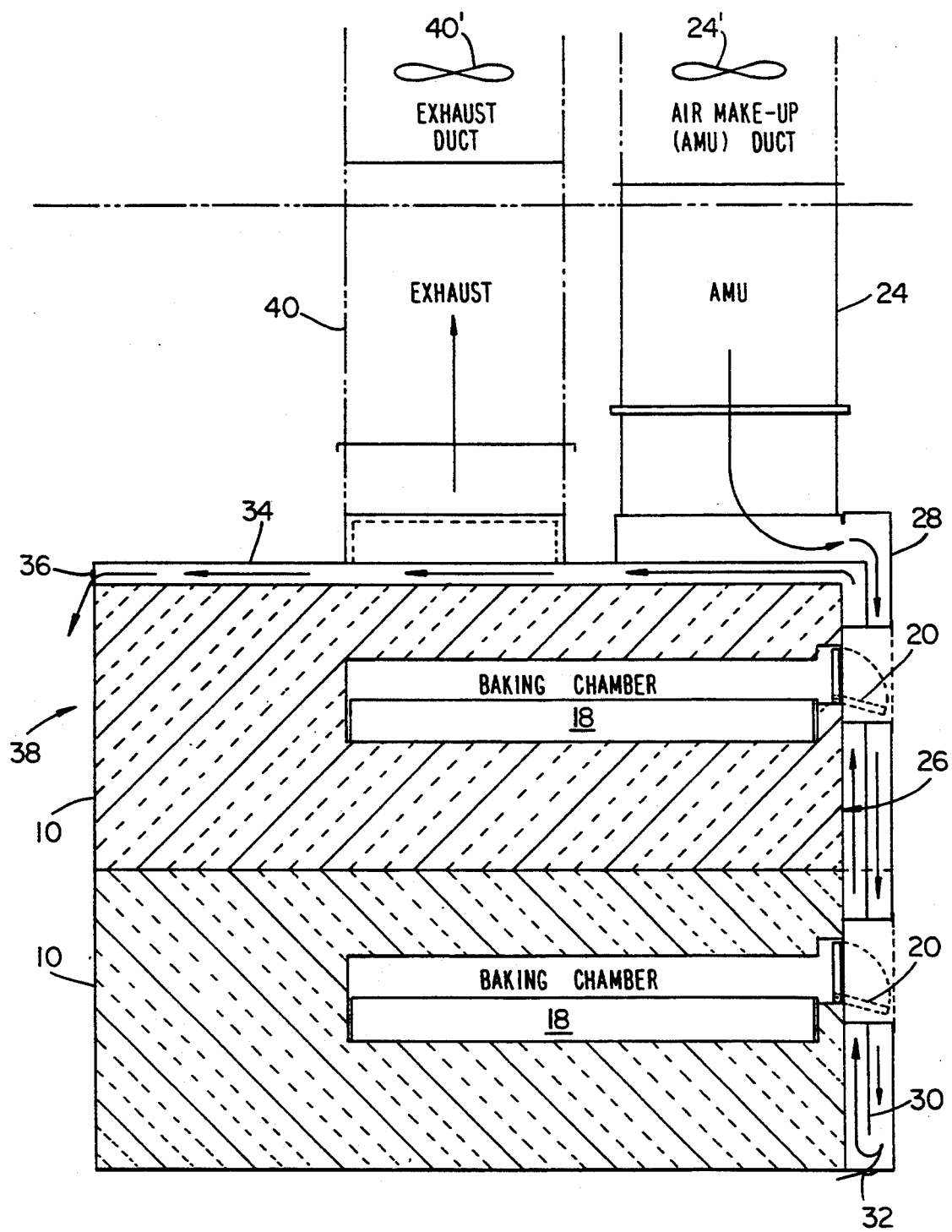
FIG. 8A is a schematic left side view of the structure of this invention.

As shown in the drawings, two stacked conveyor ovens 10 of conventional design, are provided with conveyors 14 extending from either end. Typically, food such as pizza is placed in a frozen condition at an entrance end of the conveyor. The conveyor then passes the food through the baking chamber 18 so that when it exits the opposite end on conveyor 14, it will be cooked. An observation door 20 is normally provided in the front of the machine to observe the food cooking or for cleaning and the like. FIGS. 8 (A and B) and 9 (A and B) are substantially identical side views from opposite sides. FIG. 8A illustrates the baking chamber observation door 20, whereas FIG. 9A is an end view. (FIGS. 8B and 9B are alternate embodiments as will be subsequently described.)

As shown in the embodiments of FIGS. 8A and 9A, air makeup enters from fan 24' through duct 24 and is directed along the front surface 26 of ovens 10 through a conduit 28 which includes an inner baffle 30. In the embodiment of FIGS. 8A and 9A, the makeup air travels downwardly along the outside of baffle 30 and then upwardly along the inside of baffle 30 which places the flow of air directly along the outer skin of the ovens 10. A vent 32 is provided in the bottom of the structure. Air traveling along the surface of the front 26 then further is directed through a conduit 34 along the upper surface of the upper oven 10 to exit at a vent 36 in the rear 38 of the ovens 10. Vents 36 direct this air downward over the rear walls 38 of the ovens 10.

As will be obvious to those skilled in the art then, the air passing through conduits 28 and 34 is outside air makeup, and pressure in these conduits is positive. This air is expelled into the ambient atmosphere beneath and behind the stacked ovens 10.

With attention to the embodiments of FIGS. 8B and 9B, these embodiments differ from the embodiment of FIGS. 8A and 9A in that the central baffle 30 within the makeup air front plenum is not present. With attention to FIGS. 8B and 9B, makeup air from the duct 24 enters front air plenum conduit 28' and passes downwardly across the face 26' of the ovens to the bottom thereof. At the bottom portion of the conduit 28', a vent 32' is provided for the air therein.

The airstream entering conduit 24 however, splits into a conduit 34 which forms a plenum across the upper portion of the upper oven as shown in FIGS. 8A and 9A. As shown in FIG. 8B, a series of diverter vents 29 can be provided in order to divert the stream from duct 24 into upper plenum conduit 34, or a single port as shown in FIG. 9B can be used. In this embodiment then, the cold makeup air makes a single pass across both the front surface 26 of the oven and the upper surface thereof and both streams as in the embodiments of FIGS. 8A and 9A ultimately exit into the ambient atmosphere through vents 32 and 36. The portion of the stream exiting vent 36 is directed downwardly to wash the back surface 38 of the stacked ovens, but that surface is not otherwise housed by a conduit and no plenum is formed over the back surfaces 38 of the stacked ovens 10.

Figure 4:
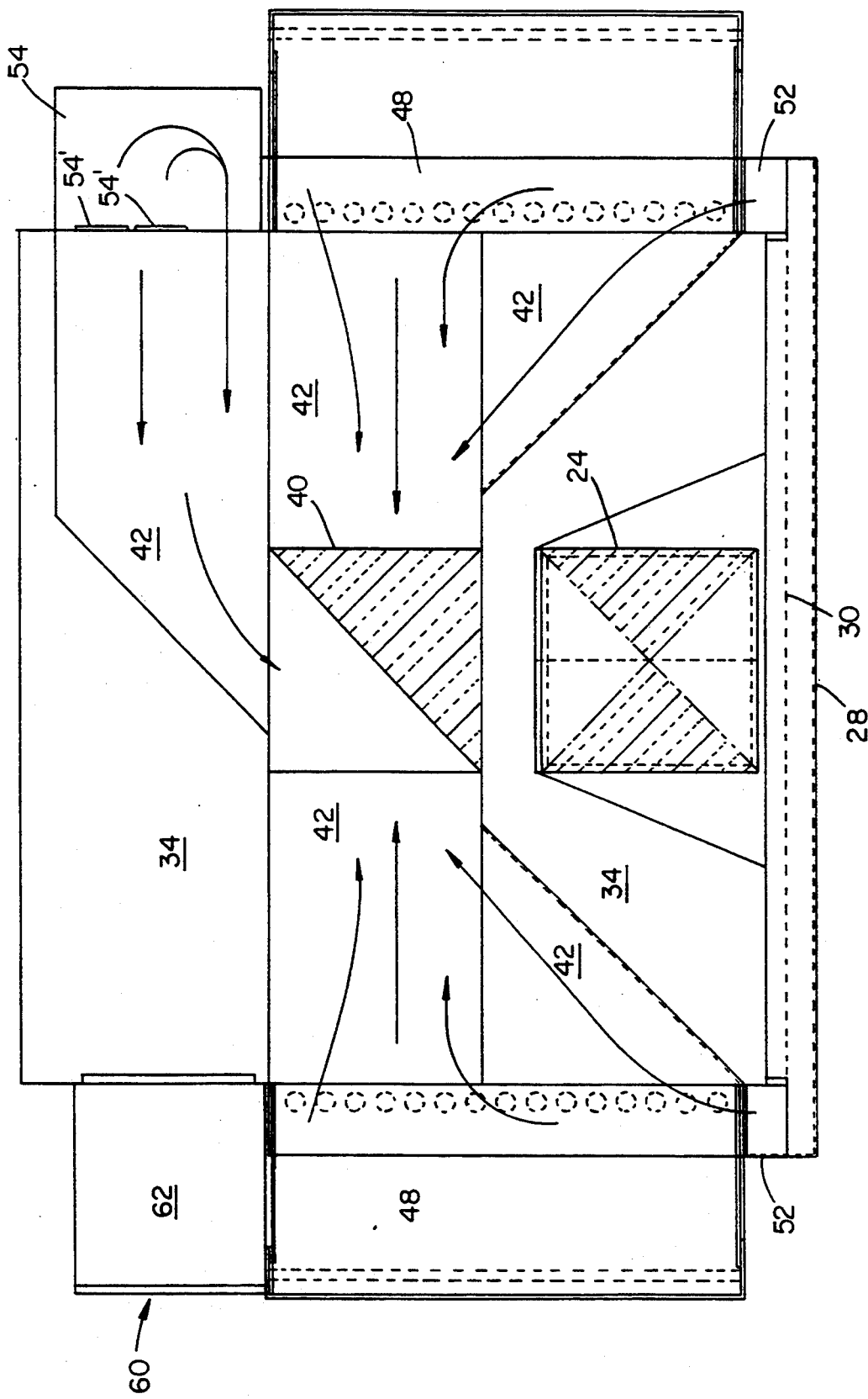
FIG. 4 is a top schematic view of the device of this invention.

With further attention to the drawings and to FIGS. 3 and 4 in particular, the exhaust system essentially covers the sides and top of the stacked ovens, with the latter being layered over the air makeup conduit 34. There is also provided a main exhaust fan 40' and conduit 40 centrally located on the top of the device. Feeding directly into exhaust conduit 40 is an upper exhaust channel 42. Right and left end enclosures are also provided with bottom enclosures 44 situated below the lowest conveyor, middle enclosures 46 and an upper enclosure 48. The latter may include optional baffles 50 as desired. If the ovens are used to cook foods having a higher grease content, these baffles 50 can serve as grease extractor baffles in an impingement device as would be obvious to one skilled in the art.

Figure 5:
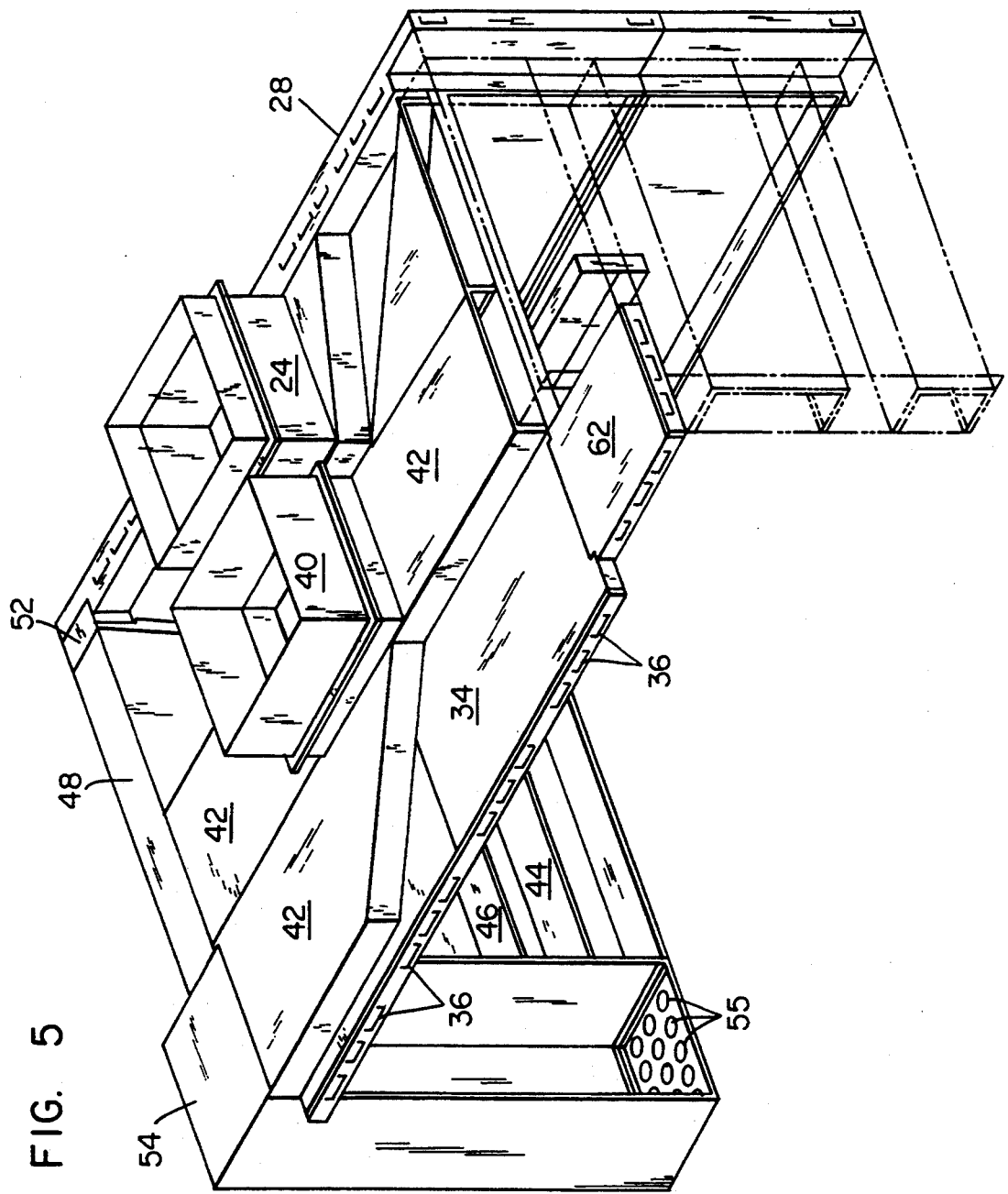
FIG. 5 is a perspective view looking from above, behind and from the left end of the structure of this invention for enclosing oven chambers.

A pair of vertical plenums 52 are disposed on the right and left front sides and an exhaust enclosure 54 is provided on the rear left side which also feeds into the upper exhaust channels 42 as shown in FIG. 4. In a conventional conveyor oven such as described in the above-identified patents, typically the heat generated by the burners is exhausted at the side of the oven adjacent the conveyor exit. There are, of course, embodiments wherein the exhaust flue is located at the back thereof. The vertical exhaust enclosure 54 then is intended to receive the exhaust from the oven heaters through ports 54' (see FIG. 4) and typically route it through conduit 42 to the exhaust conduit 40. As shown, for example in FIG. 5 however, the base of exhaust enclosure 54 contains a plurality of vents 55. Vents 55 function primarily in a failure mode situation whereby in the event of a fan failure, the burners would not necessarily be starved in the event the heating means for the ovens was gas. As will be obvious to those skilled in the art, when the exhaust fan 40' in exhaust conduit 40 is working, an upward draft will be achieved through negative pressure in enclosure 54 whereby ambient air will be entering on a continual basis through vents 55 to pass upwardly and to be expelled through exhaust duct 40.

The hot cooking gases from the oven openings which receive the conveyors 14 and the heat from around the oven cabinet are drawn upwardly as shown in FIG. 3 to ultimately be exhausted via exhaust fan conduit 40. The pressure then in the side enclosures 44, 46, and 48, and in the upper channel 42 as well as the vertical channels 52 and 54 is negative. Ports 56 are provided in the middle and upper side enclosures 46 and 48 to draw the cooking gases into these enclosures. The lower enclosure 44 generally diverts heat from around the oven skin to the exhaust.

Figure 7:
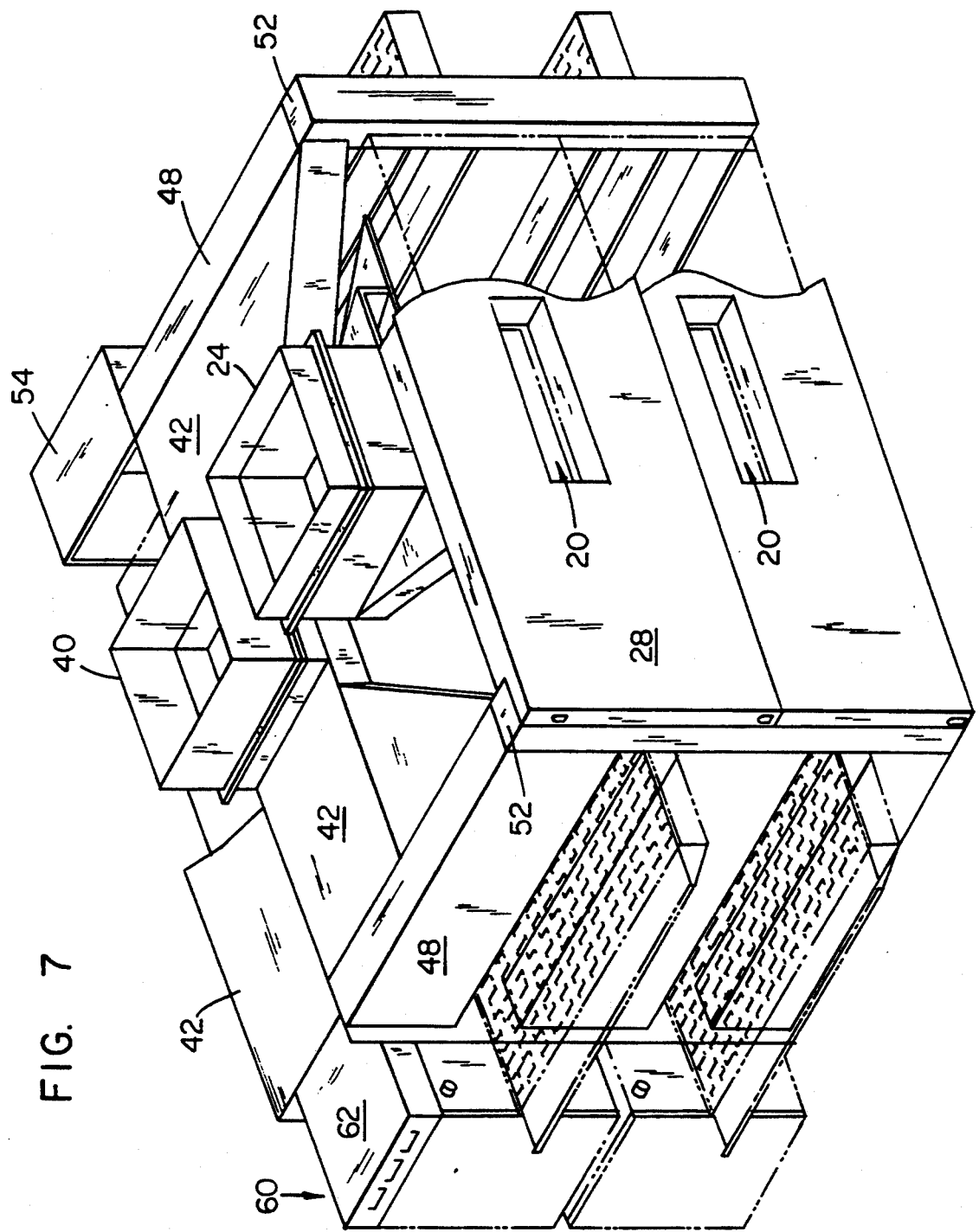
FIG. 7 is a perspective view of the ventilator components looking from the left end.

With attention to FIG. 7, an enclosure 60 is provided in the right rear for a control panel (not shown) and an air makeup channel 62 is also provided for cooling the control panel.

One of the major advantages of the instant invention is that the ovens 10 are readily available for servicing, cleaning, and the like. The exterior cooling shell of this invention, first of all, is supported by the oven structure itself in that the plenum chambers formed are all mounted on the ovens 10 as described hereinabove. Another feature of this invention which facilitates cleaning is shown, for example, with attention to FIG. 10 in that the ducts 24 and 40 may be quickly disconnected from the housing itself so that the housing can be dismantled and removed from the oven, or the entire structure moved or rotated if the ovens 10 include a lower oven with rollers on its legs, as is typical.

Figure 10:
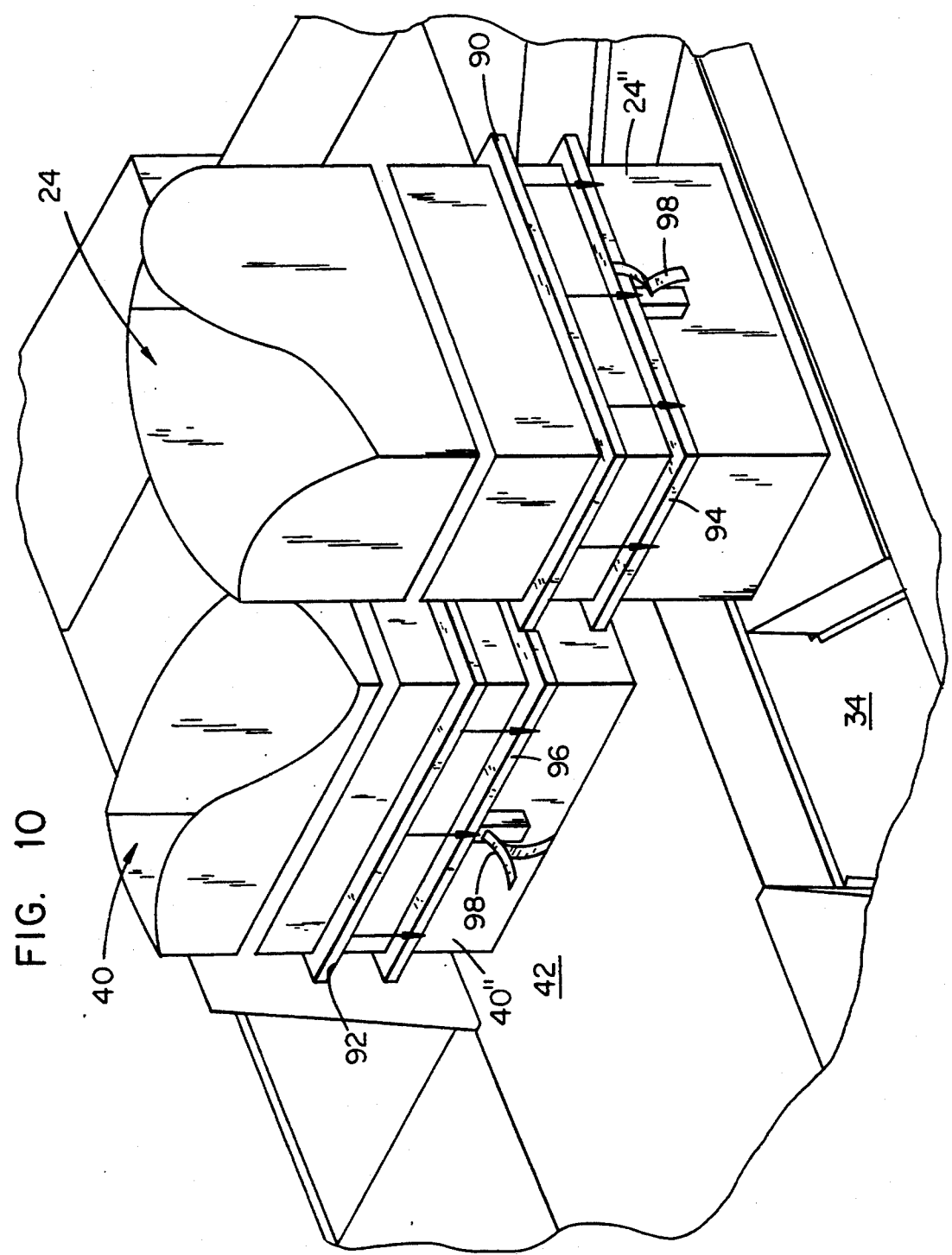
FIG. 10 is a fragmentary perspective view illustrating a quick disconnect feature of the make-up air and exhaust ducts.

As shown in FIG. 10, the ducts 24 and 40 extend downwardly and are received in corresponding duct sections for air makeup 24'' and for exhaust 40''. These communicate directly, as shown in FIGS. 8A and B and 9A and B relative to the air makeup, and in FIGS. 3 and 4 relative to the exhaust. The ducts 24 and 40 each mount a slidable, moveable collar 90 and 92, respectively, and the female sections thereof 24'' and 40'' mount corresponding collars 94 and 96. Collars 94 and 96 are immovably mounted on ducts 24'' and 40'' and in turn mount quick release latches 98. When the conduits 24 and 40 are extended into the receiving portions 24' and 40', the upper moveable collars 90 and 92 are slid downwardly as shown in FIG. 9 until the fixed collars 94 and 96 are respectively retained therein. The latches 98 then engage the respective moveable collars 90 and 92 to secure the enclosure to the respective ducts. If it is desired to dismantle the device, however, loosening of the latches will permit movement of the moveable collars 90 and 92 whereupon the collars may be slid upwardly separating duct 24 from receiving portion 24'' and duct 40 from receiving portion 40''. Therefore, the entire enclosure and ovens can be separated from the exhaust and air makeup systems. In a conventional prior art device wherein the oven enclosure is suspended from a hood, it would not be possible to dismantle the structure from the exhaust and makeup systems as readily, as will be obvious to those skilled in the art.

In summary, the design for the ventilated oven of this invention uses only a single outer wall with cooling air flowing generally between the oven outer skin and the outer wall of the enclosure. An air makeup plenum is provided across the front of the device and across the top of the device beneath the exhaust outflow channels. In contrast, the exhaust channels flow generally upwardly along the sides and across the top. Therefore, the air makeup which enters the air makeup plenums provides a positive pressure therein whereas the channels making up the exhaust system are negative. The top has both an air makeup plenum extending over the oven outer skin, and the exhaust outflow, traveling above it so that air enters and leaves the system through two ports provided in the upper or top portion of the device. In this way, the need for a double wall construction is completely eliminated. Furthermore, the air makeup is exhausted into the ambient atmosphere and does not mix with the exhaust. The exhaust however includes the products of combustion from the ovens and the cooking gases from the cooking chamber.

The exhaust, in fact, is largely made up of grease in the form of vapor. If this exhaust stream comes into contact with the relatively cool air make up the grease will tend to condense within the enclosure rather than being exhausted. Obviously, such condensation will create maintenance problems. The structure of this invention separates the air make up from the exhaust to avoid this problem. Air make up exits the plenums into the kitchen in the vicinity of the ovens both front and back. This air ventilates and cools the oven surfaces as it mixes with the ambient atmosphere. Any air drawn into the exhaust from outside the ovens then is kitchen air which has the circulated air make up mixed therein. This design feature then minimizes grease condensation in the exhaust plenums, fan and the like. It further ventilates the kitchen as air make up mixes with kitchen air to provide a more comfortable environment for the staff.

Figure 6:
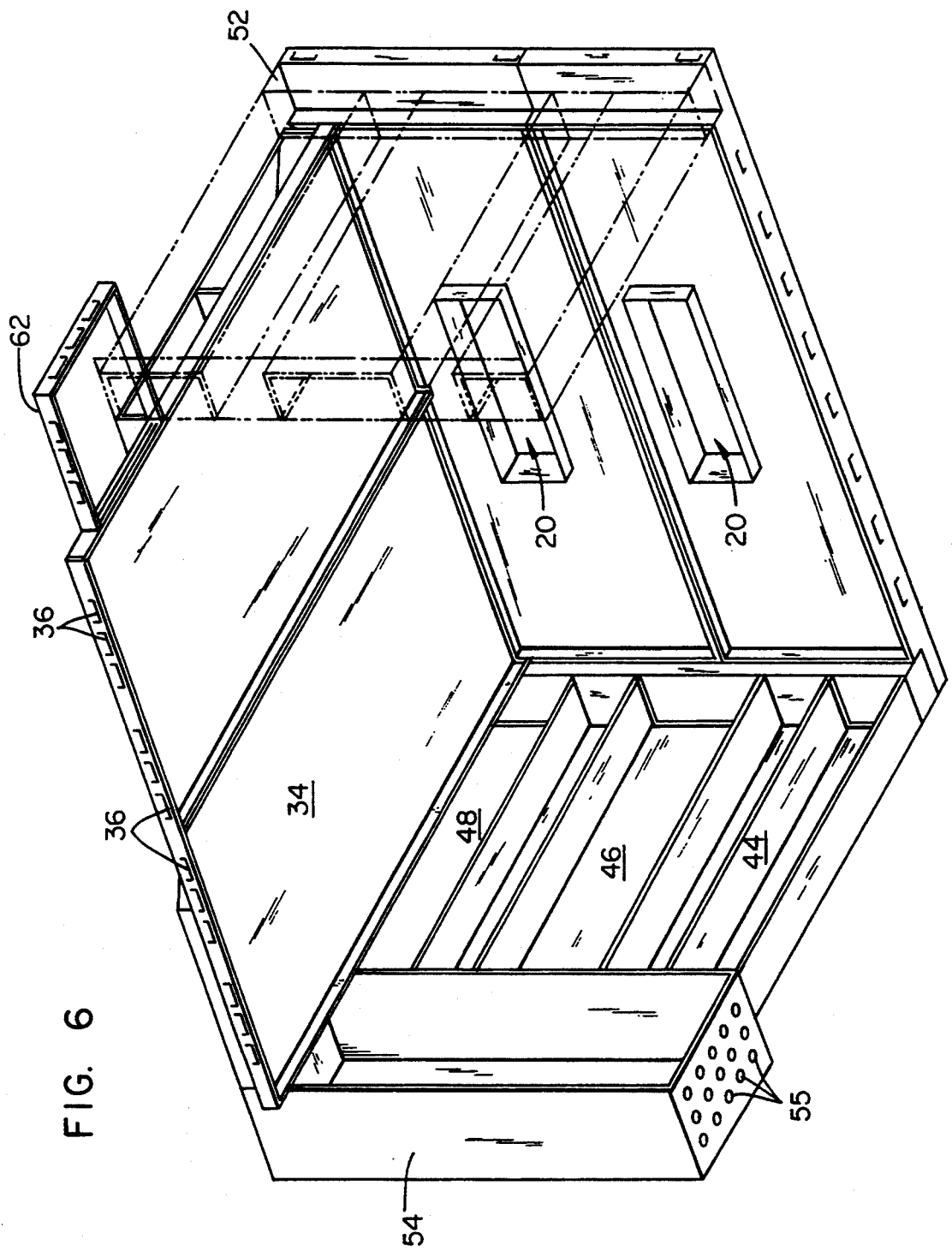
FIG. 6 is a perspective view similar to FIG. 5 looking from below, behind and from the left end at the structure of this invention without the oven chambers.

The device of this invention then can be integral with one or more ovens and this invention is not intended to be limited to the number of ovens stacked or the number of oven heating chambers provided within the device. It is not intended to be limited to a particular oven design, where the products of combustion are exhausted therefrom or even whether the oven is heated by gas or electricity. In the alternative, the device can be distributed in the form shown in FIGS. 5, 6 and 7 where it can be attached directly to existing ovens of conventional design. The device, however, is intended for use with conveyor ovens and the number of side enclosures for example will depend upon the number of baking chambers or ovens stacked within the enclosure.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A ventilated oven structure comprising
   at least one conveyor oven having top, front, back and side walls and having a cooking chamber housed within an outer skin, a conveyor extending therethrough and an entrance port and exit port in opposite side walls;
   make-up air plenums extending over the front wall of said oven and over the top wall thereof said plenums being formed between outer plenum walls spaced away from the oven outer skin and said top plenum further including downwardly directed vents adjacent the back of said oven;
   air make-up fan means communicating with said make-up air plenums for maintaining said plenums at a positive pressure;
   exhaust plenums disposed over the side walls of said oven said plenums being formed between outer plenum walls spaced away from the oven outer skin and forming respectively around said entrance and exit ports and vents therein at said ports to admit hot gases escaping from the cooking chamber therethrough;
   exhaust fan means communicating with said exhaust plenums for exhausting hot gases therefrom and for maintaining said plenums at negative pressure.

2. The oven structure of claim 1 wherein said exhaust fan means further includes a conduit extending across top wall make-up plenum communicating between said exhaust gas side wall plenums.

3. The oven structure of claim 2 further comprising first and second vertical exhaust gas plenums each disposed at a junction of the front and a side wall, lateral conduits in communication therewith extending across the oven sides, above and below the entrance and exit ports thereof.

4. The oven structure of claim 3 wherein said lateral conduits extending across said oven above each port include a plurality of vent openings for receiving hot gases expelled through said ports.

5. The oven structure of claim 1 further comprising a vertical baffle plate extending parallel to said oven front wall within said plenum for directing a flow of make-up air downwardly across the front wall of said oven.

6. The baffle of claim 5 wherein said plate further is spaced from the front plenum outer wall so that a return flow of make-up air is directed upwardly between said baffle and outer wall and into said plenum extending over the oven top wall.

7. The oven structure of claim 1 wherein said air makeup plenum extending across the front of the oven includes a vent at the bottom thereof and said air makeup fan means admits air at the top thereof.

8. The oven structure of claim 7 wherein said air makeup fan means admits air to the front portion of said top plenum in a stream split between said top plenum and said front plenum.

9. The oven structure of claim 1 wherein said conveyor oven has an access door in the front wall thereof and an access opening registering thereon is provided in the make-up plenum extending across the front of said oven.

10. The oven structure of claim 1 wherein said air make-up means and exhaust fan means each include a fan mounted above the top of said oven.

11. The oven structure of claim 1 wherein a plurality of stacked conveyor ovens are provided with entrance openings aligned vertically on one side and exit openings on the other.

12. The oven structure of claim 4 wherein a plurality of ovens are provided, vertically stacked, with entrance and exit ports in alignment and a plurality of lateral plenums are provided extending above and below each port.

13. The oven structure of claim 1 wherein said air makeup fan means and exhaust fan means include respectively an air makeup duct and fan and an exhaust duct and fan and means for separating said ducts and fans from their respective plenums including male and female duct sections, a pair thereof disposed between each fan and its respective plenum and latch means for normal locking said sections together.

14. The structure of claim 13 wherein said sections each mount a collar on said latch means engages between said collars to lock the same together.

15. The oven structure of claim 1 wherein said oven has a burner exhaust port said structure further comprising a third vertical exhaust plenum communication between the oven exhaust port and said exhaust fan means whereby exhaust gases expelled through said port will be exhausted through said exhaust fan means and said third vertical exhaust plenum will be maintained at a negative pressure.

16. The oven structure of claim 15 further comprising ports disposed in said third vertical exhaust plenum below said burner exhaust port for normally admitting ambient air into said plenum, or for exhausting heated air from said oven in the event said exhaust fan means fails.

* * * * *